United States Patent [19]

Goubeaux et al.

[11] Patent Number: 4,770,449
[45] Date of Patent: Sep. 13, 1988

[54] HIGH PRESSURE TUBE ATTACHMENT MECHANISM

[75] Inventors: Carl E. Goubeaux, Troy; Donald M. Flory, Arcanum, both of Ohio

[73] Assignee: General Motors Corporation, Detroit, Mich.

[21] Appl. No.: 76,091

[22] Filed: Jul. 21, 1987

Related U.S. Application Data

[62] Division of Ser. No. 891,442, Jul. 28, 1986, abandoned.

[51] Int. Cl.$^4$ ............................................ F16L 5/02
[52] U.S. Cl. .................................. 285/215; 285/382.5; 285/382.7; 285/422
[58] Field of Search ................. 285/189, 382, 382.7, 285/421, 422, 215, 382.5; 403/368, 374; 182/228

[56] References Cited

U.S. PATENT DOCUMENTS

| 116,098 | 6/1871 | Reynolds | 285/215 |
| 527,883 | 10/1894 | Pratt | 285/215 |
| 718,609 | 1/1903 | Drake | 285/215 |
| 1,304,414 | 5/1919 | Triplett | 285/215 X |
| 2,460,635 | 2/1949 | Herold | 285/382.7 X |
| 3,888,523 | 6/1975 | Bartholomew | 285/382 |
| 4,553,776 | 11/1985 | Doll | 285/382.7 X |

FOREIGN PATENT DOCUMENTS 15041 3/1898 United Kingdom ................ 285/215

*Primary Examiner*—Dave W. Arola
*Attorney, Agent, or Firm*—D. D. Mc Graw

[57] ABSTRACT

Various embodiments of mechanism for attaching a high pressure tube to an opening in a housing using a tapered opening into which a high pressure tube end is inserted. A securing device is positioned about the tube end and the securing device is press fitted into place in the opening so that it is press fitted not only to the housing on an outer diameter portion but also inwardly against the tube end, sealing the opening and the tube so as to hold about 5,000 p.s.i. pressure and also securing the tube against forces tending to move the tube axially or rotationally so as to loosen the tube.

3 Claims, 1 Drawing Sheet

HIGH PRESSURE TUBE ATTACHMENT MECHANISM

This is a division of U.S. Ser. No. 891,442, filed July 28, 1986 entitled "High Pressure Tube Attachment Mechanisms", now abandoned in favor of continuation-in-part application No. 076,092, filed July 21, 1987.

The invention relates to a mechanism for attaching one end of high pressure tubing to a housing which provides appropriate passages for conducting fluid under high pressure to and from the interior of the tubing. It more particularly relates to an attachment device which fits about a tubing end and is press-fitted in place so that the device is secured to both the housing and the tube end by press-fitting.

In one related invention, the embodiment of which was claimed in now abandoned application Ser. No. 891,442, and is claimed in application Ser. No. 076,092, the device is a cylindrical ferrule which is positioned about a tube end, after which the ferrule and the tube end are press fitted through a housing opening to deform at least a part of the device by a taper construction of the housing opening so that the device is press fitted to the housing and also is deformed inwardly to be press-fitted about the end of the tube. This will result in both sealing and mechanical retention of the tube in the housing.

The invention of which the embodiment is herein claimed uses a similar device which has one end closed and is provided with a cross passage for fluid connection between the interior of the tube and the housing passage. The closed end is also press-fitted into the housing opening so as to seal the housing opening at the opposite end of the device from that portion which seals the housing and tube end device together.

In still another related invention, the embodiment of which is claimed is another division application Ser. No. 075,928 filed on even date herewith, is similar to the invention herein claimed but uses a head spaced slightly from the closed enlarged section to provide an annular recess. The head is so arranged that when the device is press fitted into the housing it also deforms a portion of the housing material into the recess and further secures the device in place in the housing.

IN THE DRAWING

A device embodying the invention herein disclosed and claimed is particularly useful in attaching an end of the stainless steel spring tube disclosed in U.S. patent application Ser. No. 728,279 entitled, "Power Booster", filed Apr. 29, 1985 and assigned to the common assignee. In that application, the tube has one end fastened to a housing which is normally fixed in place and the other end fastened to another housing which is moveable. When the invention herein disclosed and claimed is used in conjunction with other invention embodiments in that arrangement, it is desirable to use the invention embodiment of FIGS. 1 and 2 at one tube end and either the invention embodiment or of FIGS. 3 and 4 or FIGS. 5 and 6 at the other tube end. High pressure fluid is delivered through the tube. The manner of fastening the tube ends in application Ser. No. 728,279 involves a tapered opening with the tube end being flared after being placed in the tapered opening. The flaring arrangement provides the necessary sealing and retention.

Figure 1:
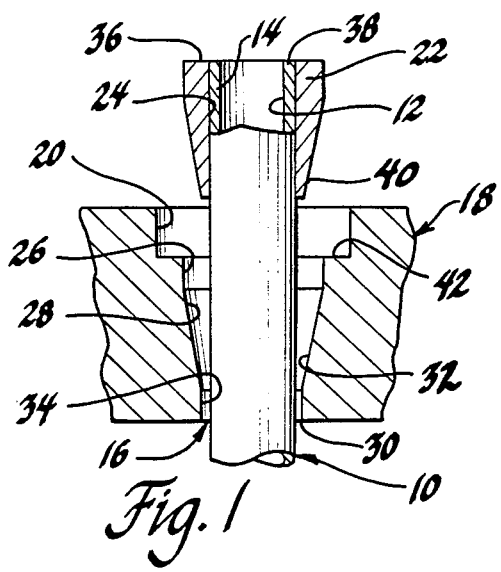
FIGS. 1 and 2 are cross-section views with parts broken away illustrating the embodiment of the first noted invention, with FIG. 1 showing the attachment arrangement before the final securing action takes place and FIG. 2 showing the invention after the securing action has been completed.
Figure 2:
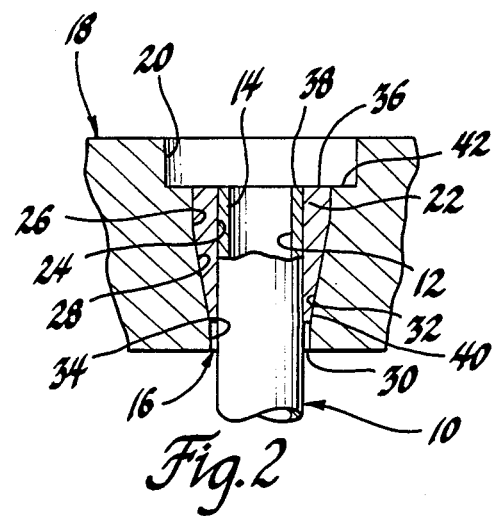

The mechanisms embodying the inventions herein disclosed include an open end attachment device illustrated in FIGS. 1 and 2 and closed end attachment devices illustrated in FIGS. 3, 4 and 5, 6. The invention herein claimed is directed to the invention disclosed in FIGS. 5 and 6.

Referring now more specifically to the drawing, the tube 10 is preferably annealed stainless steel tubing having an interior passage 12 extending therethrough. As disclosed in the above noted patent application Ser. No. 728,279, it may also function as a spring.

Referring more specifically to FIGS. 1 and 2, one tube end 14 is secured in an opening 16 formed in housing 18 so that the tube interior passage 12 is fluid connected with the space or chamber 20 within housing 18. Space 20 is essentially an extension of the opening 16. The securing device 22 is formed as a partially tapered cylindrical ferrule which has an inner passage 24 of an inner diameter which, in relation to the outer diameter of tube end 14, will permit the device 22 to fit closely but slide over the tube end. This may be readily accomplished by extending the tube end 14 into opening 16 sufficiently far to permit this to occur, as shown in FIG. 1.

Opening 16 is illustrated as being divided into a first section 26 and a second section 28, with first section 26 opening toward space 20 and second section 28 extending from the first section to the outer end 30 of opening 16 from which tube 10 is to extend after being secured in place in housing 18. The opening first section 26 may be cylindrical, and its constant diameter is sufficiently large to permit device 22 to be placed therein as it fits about tube end 14. The second section 28 of opening 16 has at least a portion 32 thereof conically tapered with about a two degree decreasing diameter taper. In each of the Figures the amount of taper is drawn exaggerated to make the taper obvious. The taper may extend to the outer end 30 of opening 16 or, as illustrated, may stop slightly short of the outer end 30 so that a minor portion 34 of the opening second section 28 is cylindrical but of smaller diameter than the diameter of the opening first section 26. The outer end 30 and the minor portion 34 of the opening second section 28 are at least as large as, and preferably larger than, the outer diameter of tube 10.

The device 22 has a transverse end surface 36 facing space 20 after installation and tube end 14 has a similar transverse end surface 38 also facing space 20 after installation, as shown in FIG. 2. Referring now to FIG. 1, these surfaces are substantially aligned in a common plane before the press-fit operation is performed. They are positioned in or adjacent space 20 with the device 22 extending toward or into the opening first section 26 for guiding relation. A suitable press arbor is then used to engage the transverse end surfaces 36 and 38 at their common plane within the housing opening so as to concurrently press the device 20 and the tube end 14 further through the opening 16. The press action causes the end 40 of device 22 to be deformed by the tapered arrangement of the opening second section portion 32, causing the device end 40 to decrease slightly in both inner and outer diameter and press radially inwardly against tube end 14 while also pressing radially outwardly against the tapered second section portion 32, as illustrated in FIG. 2. A shoulder 42 in opening 16 at the juncture of space 20 and the opening first section 26 will act to stop the press arbor and therefore locate the transverse end surfaces 36 and 38 of device 22 and tube end 14 in the plane of that shoulder which is then coincident with the common plane of surface 36 and 38, as shown in FIG. 2. This will also serve to properly locate the device 22 in relation to the tapered portion of opening 16 to acquire the proper press fit needed to secure the tube end 14 to housing 18 for mounting purposes as well as securing it against high pressure leaks. In the application of the invention to the mechanism of the above noted patent application Ser. No. 728,279 it is required that the tube end hold fluid pressure on the order of about 5,000 p.s.i., and that it resist axial and torsional forces on the tube which would tend to loosen or remove it from opening 16. It can be seen that the press fit of device 22 to both the housing 18 and the tube end 14 will form a pressure seal and function as a mechanical retainer for the tube.

Figure 3:
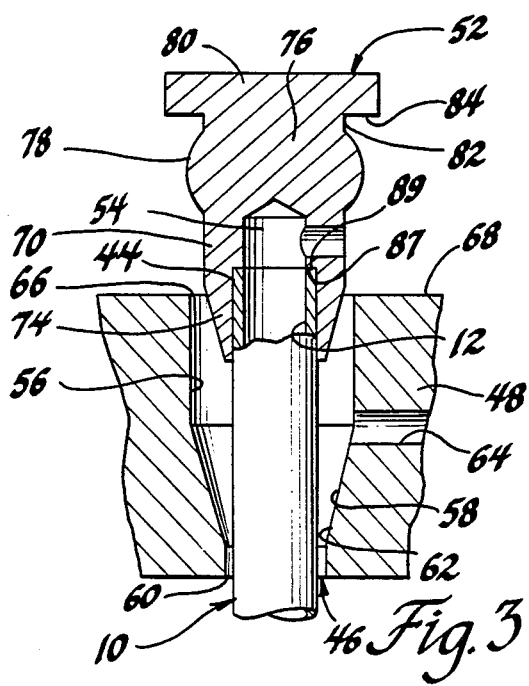
FIGS. 3 and 4 are similar to FIGS. 1 and 2 and illustrate the embodiment of the third noted invention.
Figure 4:
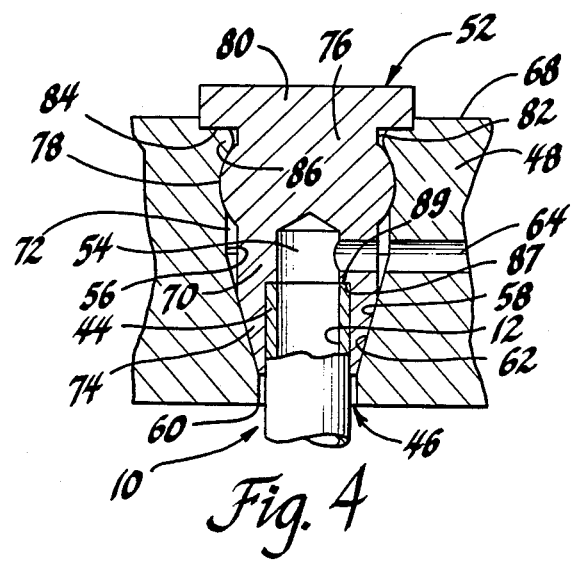

Referring now to FIGS. 3 and 4, the tube end 44, which may be the other end of the tube spring in the above noted patent application, is secured in an opening 46 in a housing 48 in a generally similar manner. However, a closed end securing device 52 is used instead of the open end securing device 22. Device 52 is provided with an inner passage 54 which extends axially part way through the device and then laterally to one side of the device.

Opening 46 has a first section 56 and a second section 58 adjacent the first section and extending to the outer end 60 of opening 46 through which tube 10 extends when secured in place as illustrated in FIG. 4. Opening second section 58 has at least a portion 62 which is conically tapered with about a two degree taper, from the juncture of the opening first section 56 and the second section 58, toward the opening outer end 60 so that the second section portion 62 decreases in diameter as it progresses from opening first section 56 toward the opening outer end. While the tapered portion 62 may extend all the way to the opening outer end 60, it is illustrated as terminating slightly short of that outer end so the portion of the opening immediately adjacent the outer end 60 is cylindrical but of a larger diameter than the outer diameter of tube 10. To the extent so far described, the construction of opening 46 is quite similar to that of opening 16 earlier described.

The housing 48 is formed to provide a side passage 64 which intersects, and is therefore in fluid communication with, a part of the opening first section 56 near the juncture of that section with the opening second section 58. As is readily ascertained, side passage 64 is therefore in fluid communication with the inner passage 54 of the closed end securing device 52 when it is installed as illustrated in FIG. 4, and therefore in fluid communication with the interior passage 12 of tube 10. The opening end 66 opposite opening end 60 extends through the housing surface 68, which is somewhat comparable to the shoulder 42 in the earlier described construction.

The securing device 52 has a first portion 70 which is the center portion having the lateral portion of passage 54 formed through one side thereof from the axial portion of passage 54. The outer diameter of portion 70 is sufficiently less than the diameter of the opening first section 56 to provide an annular space 72 therebetween, thus facilitating the fluid communication between the housing side passage 64 and the inner passage 54 of the device 52. Device 52 has a second portion 74 at one end thereof which extends toward the housing opening outer end 60. When installed, as illustrated in FIG. 4, the device second portion 74 is axially pressed into the housing opening tapered section 62.

Device 52 has a third portion 76 which defines the other end of the device opposite second portion 74. The device third portion 76 is a closed end section in that the axial portion of passage 54 does not extend therethrough. Third portion 76 has a solid diametrical section 78 which is slightly greater in diameter than the diameter of the housing opening first section 56. It is therefore the part of device 52 which is press fitted into the opening end 66 when it is being installed, closing and sealing that end of opening 46. Solid diametrical section 78 is illustrated as being shaped somewhat like the outer peripheral surface of a torus in that, as seen in axial cross-section, the surface is arcuately formed. A head 80 is formed on the outer end of third portion 76 and cooperates with the solid diametrical section 78 to provide an annular outwardly opening recess 82 therebetween. Head 80 is of any suitable shape, and may be round or hexagonal by way of example. It is of greater diameter than the solid diametrical section 78 so that when the securing device 52 is press fitted into opening 46 the solid diametrical section 78 will pass into and slightly deform the housing wall defining the first section 56 of opening 46, as illustrated. This is much like the action of using a ball to seal an opening, as shown in the above noted patent application. As the securing device 52 is further pressed in, the lower side 84 of head 80 engages the housing surface 68 about and immediately adjacent the end 66 of opening 46. As the device is pressed further inward, the head 80 causes some of the housing material to be displaced inwardly into recess 82 as illustrated at 86 in FIG. 4. This further secures device 52 in the opening 46.

The axial portion of passage 54 of device 52 is arranged to receive the tube end 44 for a distance which terminates short of the lateral portion passage 54, passage 54 being provided with a shoulder 87 which is engaged by the transverse end surface 89 of tube end 44 in abutting relation. Thus the tube end 44 is inserted into the end of axial passage 54 until it abuts shoulder 87. For this purpose the tube will have been extended through opening 46 sufficiently to make this connection before the press fitting operation as illustrated in FIG. 3. The securing device 52, with the tube end in place as described, is then press fitted into opening 46 as earlier described. In addition to the press fit action taking place between the side wall of the opening first section 56 and the solid diametrical section 78, and the housing surface 68 and the head 80 of device 52, the second portion 74 of device 52 acts in the same manner as the second portion of the securing device 22 earlier described. It engages the approximately two degree taper of the opening second section 58 so as to be deformed by the press fitting action to be press fitted to the tapered portion of the housing forming the tapered portion of second section 58, and also is press fitted inwardly to be press fitted against the outer diameter of tube end 44 to secure and seal the tube in place as illustrated. As in the embodiment earlier described, the securing and sealing action of tube 10 at its end 44 must also hold a pressure of about 5,000 p.s.i. as well as hold the tube in place against forces tending to loosen it axially or rotationally.

Figure 5:
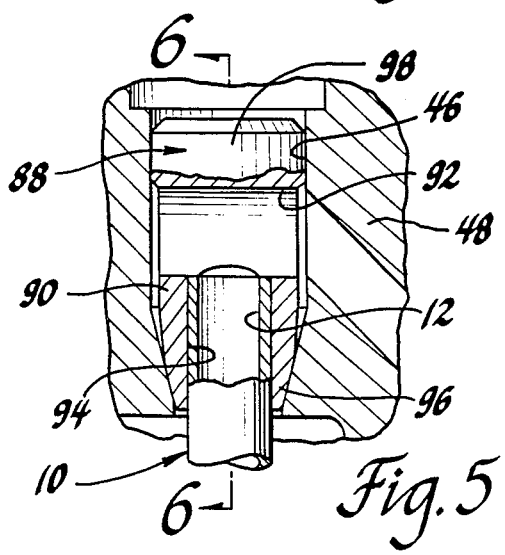
FIG. 5 is a view similar to FIG. 4 illustrating the embodiment of the invention herein claimed.
Figure 6:
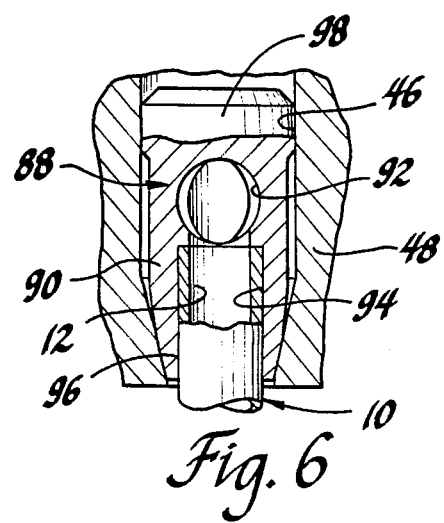
FIG. 6 is a cross-section view with parts broken away taken in the direction of arrows 6—6 of FIG. 5.

The invention embodiment shown in FIGS. 5 and 6 is somewhat similar to the securing device 52 of FIGS. 3 and 4. However, it does not have the head 80 which displaces any of the housing material into a recess. The securing device 88 of FIGS. 5 and 6 has a first portion 90 similar to the first portion 70 of device 52 except that the lateral portion of passage 54 is formed as a through passage 92 which intersects the top of the axial passage 94, the through passage 92 being of such a diameter and relative location in relation to the axial passage 94 that a shoulder is provided to engage the tube end. Otherwise the second portion 96 is constructed in a manner similar to the second portion 74 of device 52. The third portion 98 is a solid diametrical section similar to section 78 of device 52. However, in this instance it is illustrated as having beveled edge surfaces rather than being an arcuate surface.

The device 88 is installed in housing 48 in the same manner as device 72 except for the fact that it is press fitted completely into the opening 46 so that the third portion 98 closes and seals the upper end of the opening, with the press fitting sealing-and-securing action of the second portion 96 taking place at the tapered section of opening 46 as before. It may be staked for further securing action by deforming at least a part of the housing over the third portion 98.

Housings 18 and 48 may be made of aluminum or a suitable aluminum alloy, by way of example. While the securing device 22 is preferably made of annealed stainless steel, the devices 52 and 82 may be made of annealed stainless steel or brass. Tube 10 is preferably made of spring stainless steel.

The embodiments of the invention in which an exclusive property or privilege is claimed are defined as follows:

1. A high pressure tube attachment mechanism comprising:
    a housing having an opening therein through which high pressure fluid may be conducted and fluid pressure transmitted;
    a high pressure tube for conducting high pressure fluid therethrough and for transmitting fluid pressure therethrough, said tube having one open end positioned in said housing opening and in fluid communication therewith so as to conduct high pressure fluid between said opening and the interior of said tube and to transmit fluid pressure between said opening and the interior of said tube;
    and a securing device having means providing said fluid communication between said tube one open end and said housing, said securing device further having an axially extending tube-like first portion thereof received about said tube one end and within said opening in press fitted sealing relation to said tube one end and to said housing, an axially extending second portion extending inwardly of said housing opening, and an axially extending closed third portion defining the other end thereof axially opposite said first portion,
    said housing opening having a first section defined by a right cylindrically formed wall and a second section extending from said first section, said second section having at least a portion thereof conically tapered with about a two degree decreasing diameter taper, said second section terminating at the one outer end of said housing opening from which said tube extends when secured in place, the minimum diameter of said housing opening being greater than the outer diameter of said tube one end, said tube one end extending axially into said opening outer end and at least through a major portion of the conically tapered portion of said housing opening second section;
    said securing device first and second portions each having a maximum outer diameter which is less than the diameter of said housing opening first section, and a stepped inner diameter bore formed through said first portion and into said second portion in part of which said tube one end is slidably received prior to final assembly of said attachment arrangement, said securing device first portion having an end extending toward said outer end of said housing opening and fitting into said tapered second section of said housing opening, said securing device having been axially pressed to extend into said housing opening with said securing device first and third portions being press fitted in said housing opening, said first portion having been pressed to extend into said housing opening tapered second section and by press fit tapered deformation be outwardly press fitted to said housing opening tapered second section and also be inwardly press fitted to said tube one end to a sufficient extend to sealingly secure said tube one end to said housing so as to hold fluid pressure on the order of 5,000 p.s.i. and to hold said tube securely in said housing opening against axial and rotational removal forces tending to remove said tube from said housing, said third portion having been pressed into said housing opening first section and sealing same, said securing device having a shoulder formed in said securing device stepped inner diameter bore and said tube one end having a transverse end surface in abutting engagement with said shoulder during and after the press fitting action to provide axial location of said tube one end relative to said securing device and said housing opening.

2. A high pressure tube attachment mechanism comprising:
    a housing having an opening therein through which high pressure fluid may be conducted and fluid pressure transmitted, said opening including a first section and a tapered second section;
    a high pressure tube for conducting high pressure fluid therethrough and for transmitting fluid pressure therethrough, said tube having one open end positioned in said housing opening and in fluid communication therewith so as to conduct high pressure fluid between said opening and the interior of said tube and to transmit fluid pressure between said opening and the interior of said tube;
    and a securing device having means providing said fluid communication between said tube one open end and said housing, said securing device further being of lesser axial length than the axial length of said housing opening and having an axially extending tube-like first portion thereof forming one end of said securing device and received about said tube one end and within said opening in press fitted sealing relation to said tube one end and to said housing, and axially extending second and third portions extending inwardly of said housing opening, said axially extending third portion being closed and defining the securing device other end axially opposite said first portion, said securing device first and second portions each having a maximum outer diameter which is less than the diameter of said housing opening first section, and a stepped inner diameter bore formed through said first portion and into said second portion in part of which said tube one end is slidably received in prior to final assembly of said attachment arrangement, said securing device first portion having an end extending toward said outer end of said housing opening and fitting into said tapered second section of said housing opening, said securing device having been axially pressed to extend into said housing opening with said securing device first and third portions being press fitted into said housing opening, said first portion having been pressed to extend into said housing opening tapered second section and by press fit tapered deformation be outwardly press fitted to said housing opening tapered second section and also be inwardly press fitted to said tube one end to a sufficient extent to sealingly secure said tube one end to said housing so as to hold fluid pressure on the order of 5,000 p.s.i. and to hold said tube securely in said housing opening against axial and rotational removal forces tending to remove said tube from said housing, said third portion having been pressed into said housing opening first section and sealing same, said securing device having a shoulder formed in said securing device stepped inner diameter bore and said tube one end having a transverse end surface in abutting engagement with said shoulder during and after the press fitting action to provide axial location of said tube one end relative to said securing device and said housing opening.

3. A high pressure tube attachment mechanism comprising:
- a housing having an opening therein through which high pressure fluid may be conducted and fluid pressure transmitted;
- a high pressure tube for conducting high pressure fluid therethrough and for transmitting fluid pressure therethrough, said tube having one open end positioned in said housing opening and in fluid communication therewith so as to conduct high pressure fluid between said opening and the interior of said tube and to transmit fluid pressure between said opening and the interior of said tube;
- and a securing device having an axially extending tube-like first portion thereof received about said tube one end and within said opening in press fitted sealing relation to said tube one end and to said housing, an axially extending second portion extending inwardly of said housing opening, and an axially extending closed third portion defining the other end thereof axially opposite said first portion,
- said housing opening having a first section defined by a right cylindrically formed wall and a second section extending from said first section, said second section receiving said securing device first and second portions with a part of said securing device second portion being in radially spaced relation with a wall defining said housing opening to define therewith an annular chamber, said housing having a fluid passage therein opening to said annular chamber and adapted to transmit fluid to and from said annular chamber, said housing opening second section further having at least a portion thereof conically tapered with about a two degree decreasing diameter taper, said second section terminating at the one outer end of said housing opening from which said tube extends when secured in place, the minimum diameter of said housing opening being greater than the outer diameter of said tube one end, said tube one end extending axially into said opening outer end and at least through a major portion of the conically tapered portion of said housing opening second section;
- said securing device first and second portions each having a maximum outer diameter which is less than the diameter of said housing opening first section, and a stepped inner diameter bore formed through said first portion and into said second portion in part of which said tube one end is slidably received prior to final assembly of said attachment arrangement, said securing device first portion having an end extending toward said outer end of said housing opening and fitting into said tapered second section of said housing opening, said securing device having been axially pressed to extend into said housing opening with said securing device first and third portions being press fitted in said housing opening, said first portion having been pressed to extend into said housing opening tapered second section and by press fit tapered deformation by outwardly press fitted to said housing opening tapered second section and also be inwardly press fitted to said tube one end to a sufficient extent to sealingly secure said tube one end to said housing so as to hold fluid pressure on the order of 5,000 p.s.i. and to hold said tube securely in said housing opening against axial and rotational removal forces tending to remove said tube from said housing, said third portion having been pressed into said housing opening first section and sealing same, said securing device having a shoulder formed in said securing device stepped inner diameter bore and said tube one end having a transverse end surface in abutting engagement with said shoulder during and after the press fitting action to provide axial location of said tube one end relative to said securing device and said housing opening, said securing device second portion having a cross passage formed therein and opening into said annular chamber and being in fluid communication with said housing fluid passage by means of said annular chamber, said cross passage intersecting said stepped inner diameter bore through the smaller diameter thereof and providing fluid communication therebetween, said cross passage and said bore defining a fluid path through said securing device.

* * * * *